United States Patent [11] 3,533,348

[72] Inventors Akio Yanagi;
Shoichiro Kakuta, Osaka, Japan
[21] Appl. No. 578,722
[22] Filed Sept. 12, 1966
[45] Patented Oct. 13, 1970
[73] Assignee Minolta Camera Kabushiki Kaisha
Osaka, Japan
a corporation of Japan

[54] ELECTRONIC SHUTTER AND A CIRCUIT THEREFOR
3 Claims, 8 Drawing Figs.

[52] U.S. Cl. .................................................. 95/53,
95/10, 95/42, 95/55
[51] Int. Cl. ..................................................... G03b 9/00
[50] Field of Search ........................................... 95/42, 10(c),
53, 55, 56, 64(d), 57

[56] References Cited
UNITED STATES PATENTS
3,303,766  2/1967  Karikawa et al. ............... 95/10
3,324,779  6/1967  Nobusawa et al. .............. 95/42
3,332,331  7/1967  Mandler ........................ 95/42
3,336,850  8/1967  Otani et al. .................... 95/10
3,349,678  10/1967 Suzuki et al. .................. 95/10
3,385,190  5/1968  Sho et al. ....................... 95/42

Primary Examiner—Norton Ansher
Assistant Examiner—Richard L. Moses
Attorney—Anthony A. O'Brien ABSTRACT: An electric shutter for a single lens reflex camera which includes a photoelectric cell positioned to receive light from an object passing through a photographic lens, and a capacitor whose function is to memorize a voltage proportional to the brightness of the light. A field effect transistor is provided which detects the memorized voltage of the capacitor without affecting the voltage. An RC integrating circuit including an integrating capacitor, a correcting resistor and a transistor is included, of which the resistance between the output terminals is proportional to the detecting voltage. An electromagnetic mechanism, including an electromagnetic coil, is connected to the output terminal of a transistor switching circuit for closing the shutter when the voltage of the integrating capacitor reaches a predetermined level.

Patented Oct. 13, 1970
3,533,348
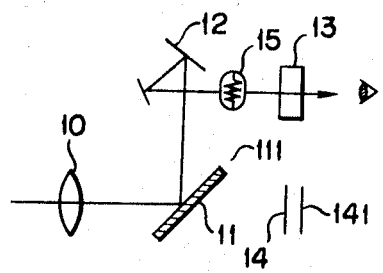
FIG. 1
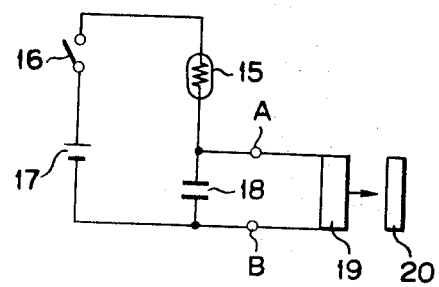
FIG. 2a
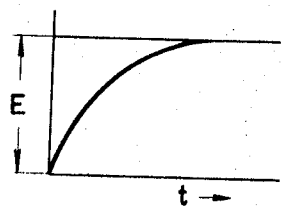
FIG. 2b
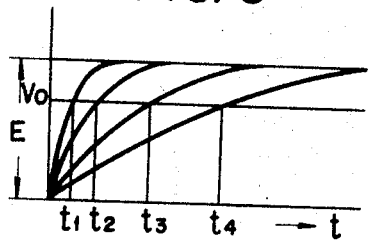
FIG. 3
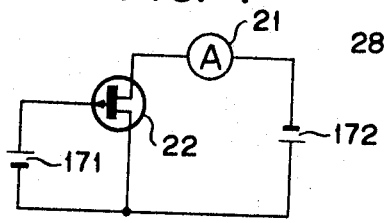
FIG. 4
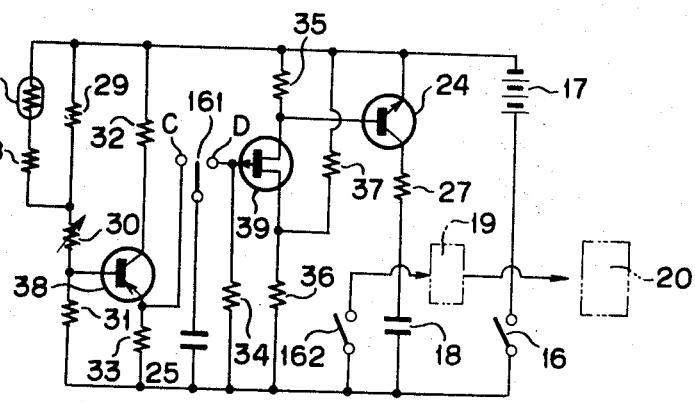
FIG. 6
FIG. 7
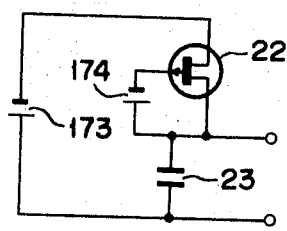
FIG. 5
INVENTOR.
BY

ELECTRONIC SHUTTER AND A CIRCUIT THEREFOR

This invention is related to an electronic shutter and a circuit therefor, and more particularly to an electronic shutter to be used in a single lens reflex camera using the so-called lens system hereafter called the TTL system for measuring the light passing through the image forming or taking lenses and an electric circuit therefor.

It has been the practice for many years to set a desired exposure by selecting the proper values for both the shutter speed and the lens aperture. In a recently devised electric eye camera, however, the shutter speed is pre-set at a certain value and the lens aperture of the camera is controlled automatically. In such electric eye camera, the brightness of an object to be photographed is converted into a magnitude of an electric current by means of a photoelectric element, and the deflection of the indicating needle of a galvanometer to measure the magnitude of said electric current is used to actuate a means for selecting the proper lens aperture. An electric eye camera having such automatic lens aperture control means has the disadvantage that it has a rather high rate of fault occurence due to the galvanometer which is of delicate mechanical construction.

In order to overcome such difficulties, there has been proposed a camera having an electronic shutter, in which the lens aperture of the camera is pre-set and the shutter speed is automatically selected. According to the principle of the electronic shutter, as the shutter button of the camera is depressed to actuate the shutter control sectors, a photoelectric element produces an electric current whose magnitude is proportional to the brightness of a photographic object and the electric current acts to charge a capacitor of a control circuit of the camera, so that upon arrival of the voltage of the capacitor at a certain predetermined value, a relay is energized to actuate the shutter control sectors.

Meanwhile, in a single lens reflex camera in accordance with the so-called TTL system, the light beam from a photographic object is reflected by a mirror after passing through the image forming lenses of the camera and then directed to the view finder thereof, while during the time period when the film is exposed to the image of the photographic object, the mirror is turned to prevent the light beam from passing to the view finder, and hence, if the photoelectric element to detect the brightness of the photographic object is placed in the view finder, then the photoelectric element cannot receive the light beam from the object during the time period of the film exposure. It is clear that the above electronic shutter can not be used in a single lens reflex camera.

An object of the invention is thus, to provide a novel electronic shutter capable of memorizing the measured value of the brightness to be used in a single lens reflex camera of so-called TTL system, characterized by utilizing a timing circuit comprising a transistor of which the internal resistance varies responsive to the base voltage thereof, said internal resistance acting as an integrating constant of the electronic shutter representing the quantity of light delivered to the camera from an object to be photographed, and a capacitor adapted to be charged to a certain predetermined voltage in a time period at least approximately proportionate to said internal resistance of said transistor.

Another object of the invention is to provide a circuit for such an electronic shutter for the single lens reflex camera of the so-called TTL system, characterized by comprising a photoelectric element to receive light from an object to be photographed through a mirror, a resistor connected in series with said photoelectric element, a first capacitor the voltage of which is adapted to be saturated up to the voltage of one of said photoelectric elements and said resistor, a transistor having an internal resistance variable responsive to the voltage applied to the base thereof, said voltage of said first capacitor being applied to said base of said transistor responsive to rotation of said mirror and the beginning of movement of the front screen of said electronic shutter, a second capacitor connected in series with said transistor, and a relay circuit to move the rear screen upon arrival of the voltage of said second capacitor at a certain predetermined value, the opening of the rear screen being in a time period representing the quantity of light received by said photoelectric element.

The other objects and features of the invention will be apparent to those skilled in the art from the following description referring to the drawings, in which:

FIG. 1 is a schematic illustration of the optical system in a single lens reflex camera having a focal plane shutter;

FIG. 2a is an electric circuit diagram, showing the principles of an integrating circuit for determining the shutter speed of an electronic shutter;

FIG. 2b is a curve representing the integrating characteristics of the circuit of FIG. 2a;

FIG. 3 shows curves similar that of FIG. 2b, illustrating the variation of the integrating characteristics when a resistance is changed while keeping a constant value of the capacitance of a condenser;

FIG. 4 is a connection diagram including a conventional field effect transistor resistance in conjunction with an ammeter;

FIG. 5 is a similar view of the circuit according to the present invention;

FIG. 6 is a connection diagram of an electronic shutter control circuit embodying the invention; and FIG. 7 is a similar view of another embodiment of the invention.

Referring to FIG. 1 showing the optical system of a single lens reflex camera using the so-called TTL system for measuring the brightness of the light beam passing through the photographing lens, the light from the photographic object is reflected by a mirror 11 after passing through the photographing lens 10, and then delivered to the view finder 13 through a prism means 12 and a photoelectric element 15. As the mirror 11 is turned around its pivot shaft 111, the light beam proceeding toward the photoelectric element 15 is interrupted, and at the same time, the front screen 14 and the rear screen 141 are opened sequentially to expose the film to the image of the object. The film exposure is controlled by a shutter sector (not shown) controlled by a circuit such as that in FIG. 2a. In FIG. 2a, when the shutter sector is opened responsive to actuation of a shutter button (not shown) a switch 16 is closed to complete a circuit tracing from an electric power source 17, through the switch 16, a photoelectric element 15 to act as a variable resistance responsive to the quantity of light received thereby, and an integrating capacitor 18 to determine the duration of exposure, and back to the electric power source 17. Thus, charging of the capacitor 18 is started. The voltage across the capacitor 18 will be increased according to the following formula responsive to the above charging.

$$V = E\left(1 - e\frac{t}{CR}\right) \cdots \cdots \quad (1)$$

Wherein,
V: is the instantaneous voltage across the capacitor 18
E: is the terminal voltage of the electric power source 17
e: is the base of the natural system of logarithms
C: is the capacitance of the capacitor 18
R: is the resistance of the photoelectric element 15
t: is the time.

Thus, the voltage across the terminals A, B of the capacitor 18 increases in proportion to charging time, and finally up to the same level as the terminal voltage E of the electric power source 17 and is saturated there if the switch 16 is kept closed (see FIG. 2b).

If the resistance R of the photoelectric element 15 is increased, then the slope of the curve of FIG. 2b is gradually reduced, as shown by curves $P_1$ to $P_4$ of FIG. 3. Accordingly, the time necessary for the terminal voltage V of the capacitor 18 to increase from zero to a predetermined level, e.g. $V_0$ is gradually increased, as shown by $t_1$ to $t_4$ in FIG. 4. In other words, the magnitude of the resistance of the photoelectric element 15 can be represented by the time for the terminal voltage V of the integrating capacitor 18 to increase from zero to a certain predetermined level.

When the voltage of the capacitor 18 reaches the predetermined level, a relay 19 is energized to actuate a mechanism 20, and the shutter sector (not shown) is closed.

If the intensity of the light beams received by the photoelectric element is assumed to be L lux, then there is the following relation between the resistance R of the photoelectric element and the intensity L of the light beam.

$$R = K_1 L^{-1} \quad \ldots \ldots \quad (2)$$

Here, $K_1$ is a constant.

One obtains the following formula from the formula (1), $$t = CR \ln\left(\frac{E-V_0}{E}\right)^{-1}, \quad \ldots \ldots \quad (3)$$

and by substituting the formula (2) into the formula (3)

$$t = CK_1 L^{-1} K_2,$$

here, $$K_2 = \ln\left(\frac{E-V_0}{E}\right)^{-1}$$

Hence, $$t = KL^{-1},$$

here, $K = CK_1$.

Therefore, the time necessary for the integrating capacitor voltage to reach a certain voltage is approximately proportional to the resistance of the photoelectric element, and the resistance of the photoelectric element is in turn approximately proportional to the brightness of the object to be photographed. Thus, it is possible to obtain a proper exposure time which is proportional to the brightness of the photographic object.

As described hereinbefore with respect to the electronic shutter, the photoelectric element is not subjected to the light beam during the film exposure, and according to the TTL system of a camera, upon rotation of the mirror, the light beam to the photoelectric element is interrupted and the screens are removed to expose the film. Consequently, it is necessary to provide a certain means to memorize the quantity of light measured by the photoelectric element to enable setting of a proper exposure time responsive to said quantity of light.

In FIG. 4 showing an electric circuit including a conventional field effect transistor in conjunction with an ammeter, 22 is a field effect transistor, 171 an electric power source for the transistor base voltage, and 172 a second power source. There is the following relation between the voltage $E_1$ (volts) of the electric power source 171, the internal resistance $R_1$ (ohms) of the transistor 22, and the current $i$ (amperes) flowing through the transistor 22.

$$i = \frac{E_1}{R_1}$$

The transistor has such characteristics that the current $i$ is proportionate to the base voltage, and hence the internal resistance $R_1$ of the transistor is proportionate to the base voltage. Accordingly, if $R_1$ is substituted with R of the formula (3), then there will be proportionality between $t$ and $R_1$. Hence, in order to fulfill the automatic operation of a focal plane shutter, it is sufficient to establish a light measuring circuit in which the base voltage is proportional to the brightness or the quantity of light of the photographic object.

The electric circuit shown in FIG. 4 has a disadvantage in that the ammeter used therein can be a cause of rather frequent faults, which hampers the satisfactory and reliable operation of an electronic shutter. Accordingly, in the electronic shutter of the invention, a field effect transistor is used, and FIG. 5 shows a circuit illustrating the principles of such electronic shutter. In the figure, 23 is a memory capacitor, 173 an electric power source for the memory capacitor, and 174 an electric power source for the base of the transistor.

The operation of the electronic shutter of the invention will now be described in further detail referring to FIG. 6 showing an embodiment thereof. As shown in the figure, a resistor 26 is connected in series with the photoelectric element 15 so disposed as to receive light from the photographic object through the photographing lens and the mirror (see FIG. 1). When the shutter button (not shown) of the camera is depressed, then the lens aperture is set at the predetermined value and the switch 16 is closed, and at the same time a selective switch 161 is so actuated as to complete the circuit between the capacitor 25 and a terminal C. Then, the voltage across the resistor 26, which is given as a part of the voltage of the electric power source 17 in proportion to the ratio of the resistance value between the resistor 26 and the photosensitive element 15, will be applied to the memory capacitor 25, and the capacitor 25 will be charged to keep its voltage saturated at said voltage across the resistor 26. As the aforementioned shutter button is depressed further, said selective switch is so actuated to complete the circuit between the memory capacitor 25 and the terminal D to deliver its terminal voltage to the transistor 24, and at the same time mirror 11 (FIG. 1) is rotated. The transistor 24 is adapted to have a resistance approximately inversely proportional to the base voltage thereof and to consume practically no base current. A resistor 27 is connected in series with the transistor 24, and normally closed front screen switch 162, which opens as soon as the front screen 14 (FIG. 1) begins to open, is connected in parallel with the integrating capacitor 18, as shown in FIG. 6. The integrating capacitor 18 is in turn connected in series to the resistor 27.

As described in the foregoing, upon rotation of the mirror, the front screen of the shutter, which is mechanically interlocked with the mirror, is opened to open the front screen switch 162. Thus, the charging of the capacitor 18 is started, and after a time period whose duration is approximately proportional to the resistance value of the transistor 24, the voltage across the integrating capacitor reaches a certain predetermined level. Then, the relay 19 is energized to actuate the mechanism 20 which in turn opens the rear screen 141 (FIG. 1) of the shutter. As soon as the rear screen of the shutter is fully opened, the normal conditions of the switches 16, 161, and 162 are restored.

Generally speaking, it is necessary to provide a time period including an exposure time ranging from 1 millisecond to 1 second plus a certain time lag for the time when the front screen is opened and the time when the rear screen is opened. According to this particular embodiment, the resistor 27 is inserted in series with the integrating capacitor to compensate for the aforementioned time lag in the range of 6.1 milliseconds to 1 second.

FIG. 7 illustrates another embodiment of the invention, which is generally similar to the preceding embodiment shown in FIG. 6, and only the differences between the two embodiments will be described hereinafter. In order to achieve the best overall brightness-resistance characteristics, resistors 28 and 29 are connected to the photoelectric element 15, as shown in the figure. To represent the sensitivity of the film to be used and the degree of lens aperture selected, a variable resistor 30 and a resistor 31 are connected in series, as shown in the figure. The voltage across the resistor 31, which represents a properly divided portion of the voltage of the power source 17, is applied to the base terminal of an amplifying transistor 38 having operating resistors 32 and 33. The terminal voltage of the resistor 33 depends on the current flowing in the emitter of the transistor 38 and is applied to the memory capacitor 25 through the selective switch 161 to charge the capacitor 25 to a saturated voltage. When the switch 161 contacts terminal D, the mirror 11 is rotated. Furthermore, the selective switch 161 is so actuated as to complete the circuit between the capacitor 25 and the terminal D to apply the voltage of the capacitor 25 to the gate terminal of the field effect transistor 39 having operating resistors 34, 35, 36, and 37. The field effect transistor 39 is adapted to have a resistance approximately inversely proportionate to the value of the base voltage and to consume practically no gate current. The drain voltage of the field effect transistor 39 is led to the base terminal of an amplifying transistor 24. The resistor 27 and the integrating capacitor 18 are connected in series to the transistor 24, as illustrated in FIG. 7.

As described in the foregoing explanation with respect to FIG. 6, according to the electronic shutter of the invention, the quantity of light received by the photoelectric element from a photographic object is memorized as an electric quantity when the light beam from the photographic object is not delivered to the photoelectric element to provide a proper exposure time responsive to the brightness of the photographic object. Thus, it is made possible to mount an electonic shutter on a single lens reflex camera using the so-called TTL system.

The invention has been described referring to particular embodiments, however, it should be understood that the invention is not limited to the embodiments and that various modifications and variations are possible without departing from the spirit and scope of the invention.

We claim:

1. An electric shutter circuit for a single lens reflex camera, comprising a photoelectric cell positioned to receive light from an object passing through a photographic lens, a capacitor adapted to memorize a voltage proportional to the brightness of said light, a field effect transistor which detects said memorized voltage of said capacitor without affecting the voltage, RC integrating circuit including an integrating capacitor, a correcting resistor, and a transistor of which the resistance between the output terminals thereof is proportional to the detected voltage of the field effect transistor, a switch connected in parallel with said integrating capacitor and opened in relation to opening movement of the shutter, a transistor switching circuit actuated by said RC integrating circuit, and an electromagnetic mechanism including an electromagnetic coil connected to the output terminal of said transistor switching circuit for closing the shutter when the voltage of the integrating capacitor reaches a predetermined level.

2. An electric shutter circuit as claimed in claim 1, wherein said shutter is a focal plane shutter with front and rear screens, the integrating capacitor commencing charging in relation to the opening movement of the front screen, and when the voltage of said integrating capacitor reaches said predetermined level, the rear screen is released to terminate the film exposure by the actuation of the transistor switching circuit and electromagnetic mechanism.

3. An electric shutter circuit as claimed in claim 1, further comprising resistors for correction of the characteristic of the photoelectric cell and for adjusting the circuit in accordance with photographic conditions, a circuit for amplifying voltage to be memorized in the capacitor, and a transistor which amplifies the output voltage of the field effect transistor, the resistance between the emitter and the collector of the first transistor being used as a resistance of the RC integrating capacitor.